United States Patent [19]

Brunner et al.

[11] Patent Number: 4,809,023

[45] **Date of Patent: * Feb. 28, 1989**

[54] AUTOMATIC PENCIL DEVICE FOR AUTOMATIC DRAFTING AND WRITING MACHINES

[75] Inventors: Engelbert Brunner, Zirndorf; Karl Kaiser, Wendelstein, both of Fed. Rep. of Germany

[73] Assignee: J. S. Staedtler GmbH & Co., Nuremberg, Fed. Rep. of Germany

[ * ] Notice: The portion of the term of this patent subsequent to Sep. 3, 2002 has been disclaimed.

[21] Appl. No.: 520,633

[22] Filed: Aug. 5, 1983

[30] Foreign Application Priority Data

Aug. 7, 1982 [DE] Fed. Rep. of Germany ....... 3229498

[51] Int. Cl.⁴ ...................... G01D 15/16; B43L 13/00; B41J 11/20

[52] U.S. Cl. ................................. 346/139 R; 401/53; 33/18.1

[58] Field of Search ...................... 346/139 R, 139 C; 33/18 R; 401/53

[56] References Cited

U.S. PATENT DOCUMENTS

| | | | |
|---|---|---|---|
| 1,430,204 | 9/1922 | Waring | 401/53 |
| 3,345,640 | 10/1967 | Sicking | 346/139 R |
| 3,424,535 | 1/1969 | Schischkow | 401/53 |
| 4,015,269 | 3/1977 | Edo | 346/139 C |
| 4,346,392 | 8/1982 | Isobe | 346/139 C |
| 4,426,783 | 1/1984 | Gerber | 346/139 C |
| 4,452,544 | 6/1984 | Sumita | 401/53 |
| 4,478,529 | 10/1984 | Morio | 401/53 |
| 4,490,061 | 12/1984 | Katz | 401/53 |
| 4,538,934 | 9/1985 | Brunner | 401/53 |

FOREIGN PATENT DOCUMENTS

| | | | |
|---|---|---|---|
| 3013973 | 10/1980 | Fed. Rep. of Germany | 346/139 R |

*Primary Examiner*—E. A. Goldberg
*Assistant Examiner*—Mark Reinhart
*Attorney, Agent, or Firm*—Edmund M. Jaskiewicz

[57] ABSTRACT

An automatic lead pencil device has a casing which is releasably mountable in a bracket of a drafting machine. Within the casing, there is a clamp sleeve in which a clamping member is axially movable for clamping and releasing a lead during use of the pencil device. An axial movable lead guide tube projects outwardly of the casing in the rest position, and there is a pencil brake within the lead guide tube. The contact zone between the clamping member and the clamp sleeve is constructed so as to be of the non-self-locking type. There is an operative connection between the clamping member and the lead guide tube such that the clamping member is closed when the lead guide tube moves axially inwardly to assume the working position and opens when the lead guide tube moves axially outwardly toward a rest position.

13 Claims, 4 Drawing Sheets

AUTOMATIC PENCIL DEVICE FOR AUTOMATIC DRAFTING AND WRITING MACHINES

BACKGROUND OF THE INVENTION

The present invention relates to an automatic pencil device which can be releasably mounted in an automatic drafting or writing machine, more particularly, to such a device which has an automatic lead advancing mechanism.

An automatic pencil device with a lead advancing mechanism have been devised, particularly for mounting on automatic drafting, writing or recording machines. Such a pencil device generally comprises an axially movable clamping member to clamp a lead in position during the writing process and a lead guide tube having a lead brake and the tube being axially movable and projecting outwardly of the pencil casing in the rest position. The pencil device is generally mounted in a bracket in such a manner that the device can be mechanically brought into the working or rest positions. Such a writing instrument is disclosed, for example, in DE-OS No. 30 13 973. However, this device has the disadvantage that it has a very complicated and expensive clamping and control mechanism as well as a force applying system several springs required to actuate the lead feed. In addition, this writing instrument does not provide for any automatic follow-up of successive leads after the lead in the writing position is used up.

In addition to the foregoing disadvantages, this prior art instrument has the individual components mounted in several separate mountings so that for example a change to another lead diameter or to another lead color is very difficult and use in another recording mechanism is practically impossible.

Other automatic pencil devices are known from U.S. Pat. Nos. 4,091,393, 4,015,269 and 3,345,640. These pencil devices have a somewhat more simplified construction but still have essentially the same disadvantages as described above. In particular, there is no automatic lead follow-up and replacement leads cannot be introduced. As a result, the recording process must be interrupted to replace leads. In addition, special actuating mechanisms are continuously required on the recording mechanism.

It is therefore the principal object of the present invention to provide a novel and improved automatic pencil device which is particularly adapted for an automatic drafting or writing machine and the like.

It is another object of the present invention to provide such an automatic pencil device which not only automatically advances the lead during use, but also provides for the follow-up of successive leads.

It is a further object of the present invention to provide such an automatic pencil device which is simple in construction, inexpensive to fabricate, and reliable in operation.

It is an additional object of the present invention to provide such an automatic pencil device which can be readily and easily replaced and can be used in virtually all recording machines without the necessity of providing for a special control mechanism.

SUMMARY OF THE INVENTION

According to one aspect of the present invention, an automatic pencil device particularly for an automatic drafting or writing machine may comprise a casing which is mountable in a bracket of a drafting machine, and such a bracket is generally movable to bring the pencil device into a working position or a rest position. Within the casing is a clamp sleeve and the clamping member is axially movable within the clamp sleeve for clamping and releasing a lead during use of the pencil device. An axially movable lead guide tube projects outwardly of the pencil device casing in the rest position and a lead brake is mounted on the lead guide tube. There is provided a means for defining a non-self-locking contact zone between the clamping member and the clamp sleeve. There is further provided means for defining an operative connection between the clamping member and the lead guide tube such that the clamping member is closed when the lead guide tube moves axially inwardly while assuming the working position and opens when the lead guide tube moves axially outwardly to the rest position.

The automatic non-self-locking contact zone between the clamping member and the clamp sleeve makes possible an easy and quick release of the clamping member from the closed or clamping position in order to release the lead such that the lead is held only by the lead brake mounted in the lead guide tube. The operative connection which transmits force between the lead guide tube and the clamping member enables the lead guide tube to be pushed downwardly so as to project outwardly of the writing point immediately or with a time delay (if there is a play in the operative connection) during the change from the working to the rest position. In the rest position, the clamping member is in its unclamping or open position and the working lead, i.e., the lead which is doing the writing, is held only by the lead brake. However, while changing to the working position, when the lead guide tube contacts the recording or writing surface, the clamping member closes over the operative connection so that the lead is then held exclusively by the clamping member. During the working or writing process, and depending upon the wear of the lead, the lead guide tube by overcoming the axial holding force of the lead brake slides into the writing device or into the writing point of the pencil device. The lead guide tube can slide axially inwardly until the front or leading edge surface of the lead guide tube is in the same plane with the opening of the writing point. It is then only necessary to provide for a momentary change of position in order to renew the supply of lead.

Since the maximum duration of the writing period depends on the distance to which the lead guide tube projects outwardly of the writing point, this distance can be selected to meet most desired requirements. Generally, a projecting length of three to six mm. is sufficient. However, in the case of long, continous lines, as may occur, for example, in the case of an automatic recording machine, a short switching pulse can be preprogrammed so that the machine stops after, for example, two meters of uninterrupted linear movement. The writing device is lifted and then immediately set down again to advance the lead.

DESCRIPTION OF THE DRAWING

Other objects and advantages of the present invention will be apparent upon reference to the accompanying description when taken in conjunction with the following drawings, which are exemplary, wherein.

DESCRIPTION OF THE PREFERRED EMBODIMENTS

Proceeding next to the drawings wherein like reference symbols indicate the same parts throughout the various views a specific embodiment and modifications of the present invention will be described in detail.

Figure 1:
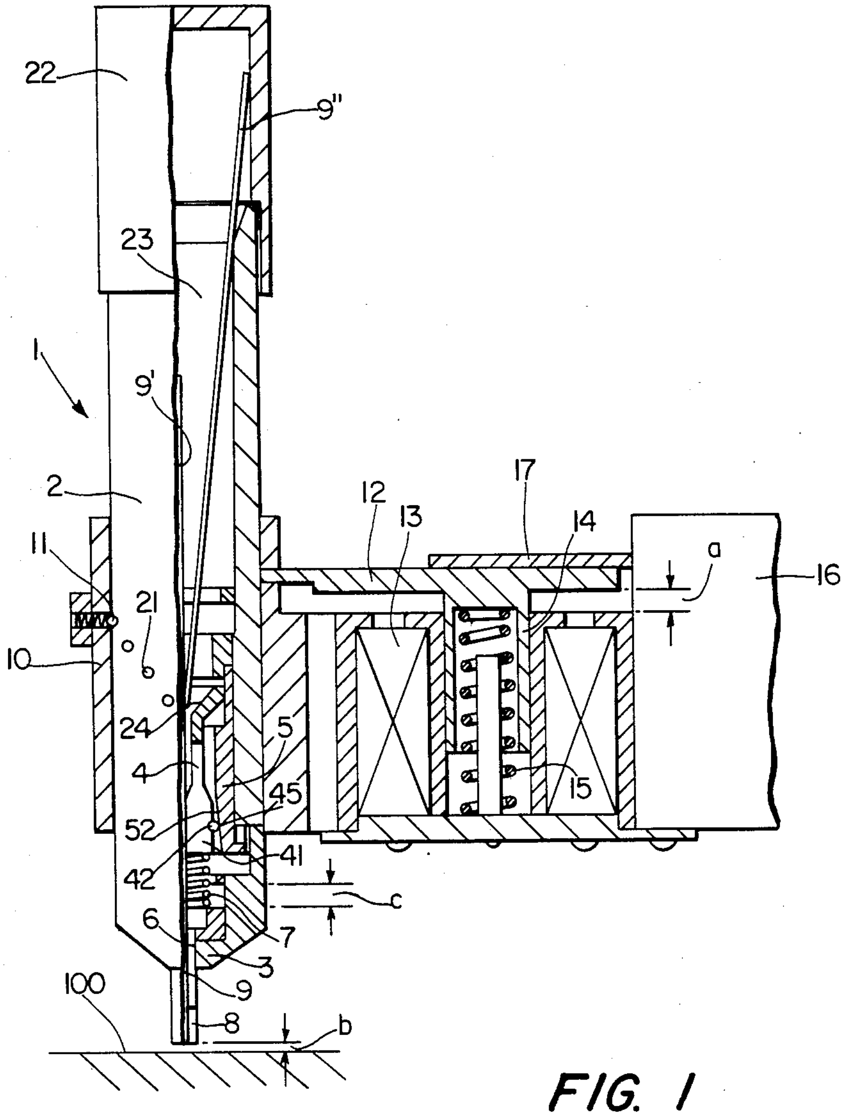
FIG. 1 is a side elevational view of a pencil device according to the present invention with half of the pencil device being shown in a longitudinal section and the mounting bracket being shown in a vertical section.

As may be seen in FIG. 1 an automatic pencil device indicated generally at 1 comprises a casing or housing 2 having at its front or lower end a writing point 3 and having at its upper or rear end a cap 22 which closes the casing. The pencil device is mounted in a bracket 10 and retained in a desired axial or vertical position by means of a spring loaded adjustment knob or detent 11 which is received into a selected one of a plurality of recesses 21 formed in the outer surface of the casing 2.

The bracket 10 is axially or vertically movable and is mounted on positioning arm 12 on the underside of which is securely attached a guide tube 14 which is urged upwardly by a spring 15 against a stop or stroke limiting abutment 17.

The displacement stroke a of the bracket 10 must be equal to or greater than the distance b between the front end of lead guide tube 6 and writing support surface 100 and the displacement path c of the lead guide tube 6. The path c consists of its maximum working stroke d and a possible idle or clearance stroke e.

An electric magnetic coil 13 surrounding the guide tube 14 is energized from a control unit 16. When the coil 13 is energized, positioning arm 12 together with bracket 10 together with pencil device 1 are moved downwardly through a distance b and possibly an existent idle or clearance e until the outer or lower end of lead guide tube 6 or lead 9 contained within the lead guide tube contacts the recording support surface 100.

Fixed within the casing 2 is a cylindrical clamp sleeve 5 the lower inner surface of which is conical or beveled at 52. Axially movable within the sleeve 5 is a clamping member 4 which is provided with two or more radially movable gripping or clamping jaws 41. These jaws may be formed by making a plurality of longitudinally extending slots in the clamping member 4 which is substantially tubular in shape. The clamping member 4 has a central passage or bore through which passes a lead 9 which lead is also secured in the writing position by the clamping jaws 41.

The outer surface of the clamping member 4 is provided with a plurality of recesses and in the respective recesses is a corresponding plurality of ball bearings 42 which are engageable with the clamp sleeve conical surface 52. The conical surface 52 acting upon the bearings 42 as the clamping member 4 moves axially upwardly exerts a radially inward force on the jaws 41 to cause the jaws 41 to grip the lead 9 securely against any axial movement.

The upper end of clamping member 4 is provided with an inwardly directed conical or bevel surface 24 which opens toward the lead storage compartment 23 in which are stored a plurality of leads 9″. The conical surface 24 facilitates the movement of successive leads into the central passage of the clamping member and into the writing position.

On the front face of clamping member 4 directed toward the writing point there is positioned a compression spring 7 the other end of which bears against an axially movable lead guide tube 6. The lead guide tube 6 is hollow so as to accommodate lead 9 therein and has mounted therein a resilient lead brake 8 which exerts an axial holding force on the lead. In the rest position, the lead guide tube 6 projects outwardly of the writing point 3 as shown in FIG. 1.

In the working position, the outer end of the lead guide tube 6 and the lead 9 contained therein are in contact with the writing surface 100. During writing or recording, the lead guide tube 6 will slide axially inwardly into the writing point 3 as a result of wear on the lead 9. The continued inward movement of the lead guide tube 6 as the lead 9 wears must overcome the increasing force exerted by the compression spring 7 and the axial holding force of the lead brake 8 exerted on lead 9 which is retained in a fixed axial position by the clamping member 4.

In order to continuously assure the functional reliability and the opening of the clamping member 4, the space between the inner end of lead guide tube 6 and the front face of clamping member 4 can be somewhat greater than the axial length of the relaxed compression spring 7. With this construction, the clamping member 4 can be released during lifting by the impulse applied by the coil 13 without the necessity of the clamping member being acted upon by a spring in contact zone 45 and the clamping member 4 can then fall forwardly or downwardly and open completely. Because of play, a short idle stroke e comes into existence during the setting down of the clamping member 4. However, this play can be easily compensated by path a measuring the movement between bracket 10 and positioning arm 12.

As soon as the clamped working lead 9 is worn off, follow-up lead 9′ which has already been fed into the bore of the clamping member can be used. The next successive replacement lead 9″ will then fall downwardly within storage compartment 23 into the conical passage 24.

The conical surface 52 of the clamp sleeve 5 and the ball bearing 42 on clamping member 4 define a non-self-locking contact zone between the clamping member 4 and the clamp sleeve 5.

The operative connection to transmit force between the lead guide tube 6 and the clamping member 4 thus includes the compression spring 7 which can act upon both of these components directly or indirectly through an intermediate thrust member. The contact zone 45 can also be so constructed that the axially directed force exerted by spring 7 is divided into axial and radial force components.

While only a single spring 7 has been described, it is apparent that one or more springs having different spring forces can be utilized or different springs having different directions of action can also be employed.

A thrust member between the clamping member 4 and the lead guide tube can be so constructed as to transmit a force to the clamping member which not only moves the clamping member axially but also opens the clamping member radially.

It is preferable for reliable operation of the writing device that the axial clamping force of the clamping member 4 in the rest position be equal to 0 or be smaller than the axial holding force of the lead brake 8. Thus, the lead 9 is held practically pressure-free merely by the lead brake 8 while in the working position the axial clamping force of the clamping member 4 under the action of the lead guide tube 6 through the axial operative connection therebetween and the axial movement back of both components is greater than the holding force of the lead brake. Thus, as the working lead which is held only by the clamping member is worn off during writing, the lead brake can slide over the lead during the wearing of the lead.

During or after lifting of the lead guide tube 6 from the writing surface 100, the lead guide tube will slide forwardly because of the axial force exerted by compression spring 7 until the lead guide tube rests upon a stop surface within the writing point 3 at which point there is a change from the working to rest position. However, before the lead guide tube 6 comes to this stop, the clamping member 4 moves axially forward and radially outwardly in such a way that its radial clamping action and its axial clamping force are cancelled and the lead 9 is released. Because of the holding force exerted by lead brake 8, the lead 9 is then carried forward as the lead guide tube 6 continues to move axially forwardly to the point at which the writing device is again ready to write.

Since the clamping member 4 or its clamping jaws 31 are always open in the rest position of the writing device, the followup lead 9' can easily fall through the clamping member to strike against the working lead can be securely retained in position and carried by the clamping member.

Figure 2:
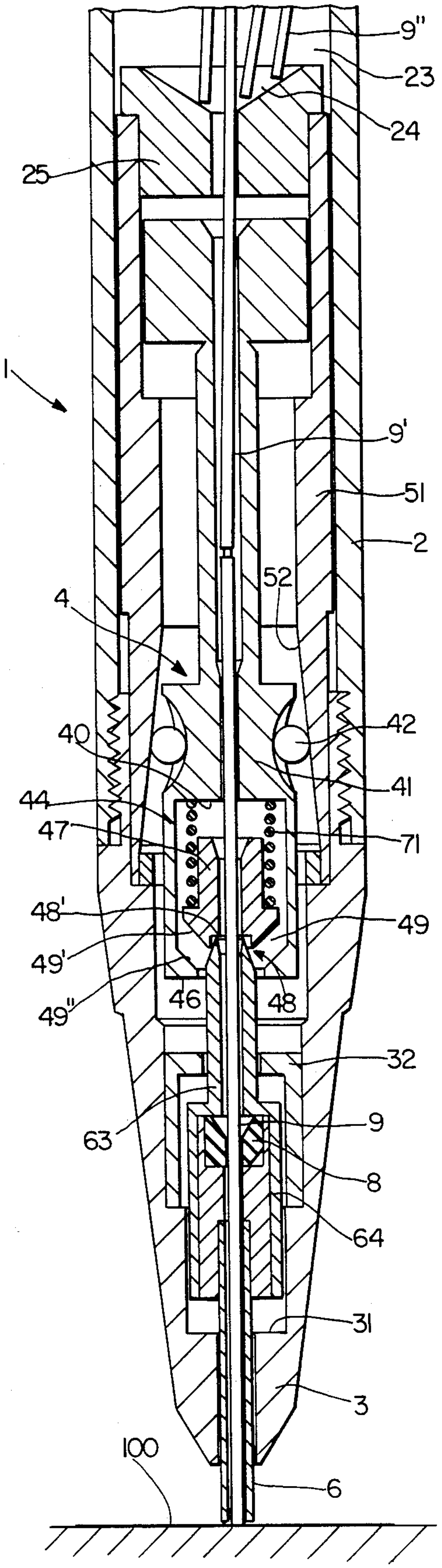
FIG. 2 is a longitudinal sectional view of a modification of the pencil device and showing the device in the working position.

In FIG. 2 there is illustrated in the working position a pencil 1 which has been described in detail in my co-pending application. In the working position, the lead guide tube 6 and the lead 9 are in contact with the recording support for writing surface 100. An annular stop shoulder 31 in writing point 3 which is threaded to the casing 2 is thus exposed since the sliding insert 64 is in its inward position. The lead guide tube 6 is mounted in the insert 64 in which is also mounted the lead brake 8.

Extending upwardly from the sliding insert 64 is a tubular contact sleeve 63 the upper end of which has a contact surface 48' which engages thrust member 47 which in turn is moved rewardly against the action of a compression spring 71 one end of which rests upon the front surface 40 of the clamping member 4. As a result, the movement of the bearings 42 along the conical surface 52 will close the clamping jaws 41 and clamping member 4 to securely hold the lead 9 in an axial position. Also within the writing point 3 is fixedly mounted a stop ring 32 which has an opening there through for sliding movement of the tubular extension 63 and to function as a guide sleeve for the slidable insert 64.

A first operative connection is thus formed in contact zone 48 which transmits pressure and is active in the working position between lead guide tube 6 and clamping member 4 together with thrust member 47 and compression spring 71. In the rest position, there is another operative connection 49 formed by the bevel surfaces 49' on the inner surfaces of the stop claws 46 and the bevel surfaces 49' on the lower edge of thrust member 47. The stop claws 46 are connected by rigid axially extended arms 44 with the clamping jaws 41 and clamping member 4. The operative connection 49 is interrupted in the working position of the writing device 1 and becomes effective only after the writing device 1 has been lifted from surface 100 and the jaws 41 of the clamping member are pressed apart radially to release the lead 9 therefrom.

The upper end of clamping member 4 is provided with an annular collar which functions as a slide guide within a cylindrical surface of clamp sleeve 51 which is secured within casing 2 and closed at both ends such that the entire clamping mechanism forms a closed unit which can be assembled as a unit within the casing 2.

The thrust member 41 has a central passage there through which has a diameter larger than the lead 9 and a similarly sized central passage is found in the closure cap 41 at the top end of clamp sleeve 51. The clamping member 4 is also provided with an enlarged central bore above the clamping jaws 41 which are constructed so as to have only a slight clearance from the lead 9 when in the open position. Within these passages as described will thus be found successively, the working lead 9, follow-up lead 9' as well as the replacement leads 9'' all of which will be used without any additional handling of the lead and will be automatically supplied as successive leads become worn.

Figure 3:
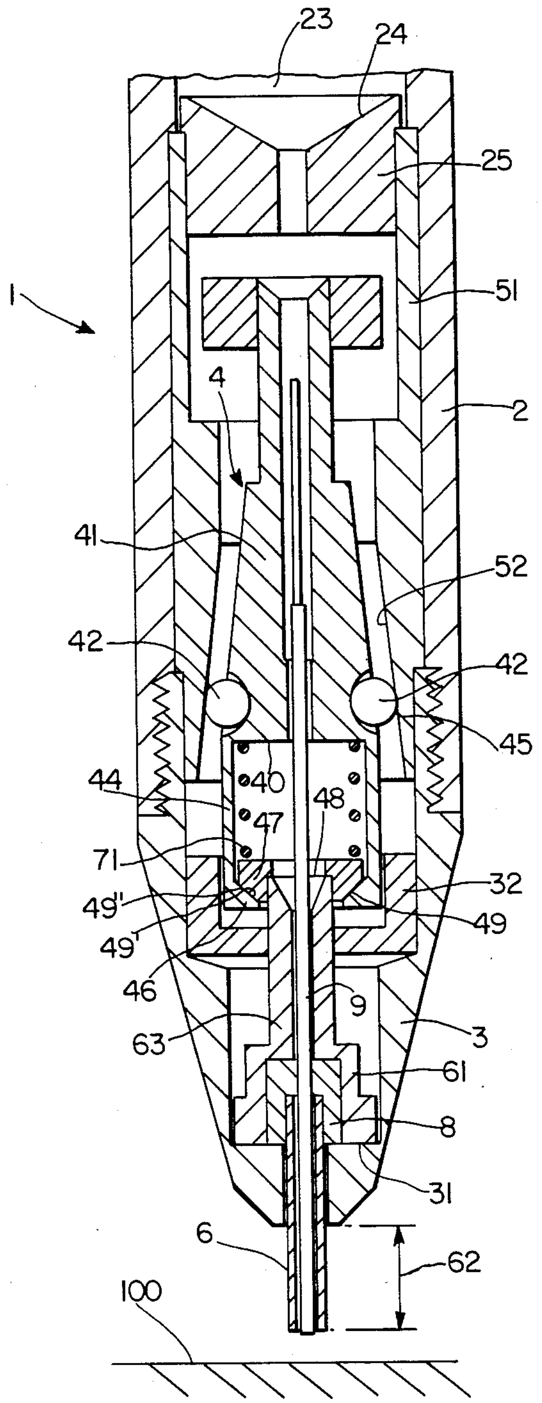
FIG. 3 is a view similar to that of FIG. 2 but showing the pencil device in the rest position.

In FIG. 3, the writing device 1 is shown in the rest position and has a clamp sleeve 51 secured within the casing 2 and at its upper end provided with a closure or end cap 25 having a central passage there through and a conical surface 24 leading to the central passage. The clamp sleeve 51 has a conical or bevel surface 52 on the lower end thereof as shown. Leads which are kept in the lead storage chamber 23 can thus readily slide down the inclined surface 24 into the central passage of the end cap 25 and into the clamping member. The end cap 25 also defines the lower partition of the lead storage chamber 23.

At the upper end of the clamping member 4 there is a tubular extension on the extreme end of which is a weighted collar which is engageable with a shoulder on the interior of the clamp sleeve 51 so as to limit the downward movement of the clamping member 4. The collar also serves as a weight to assist in the downward movement of the clamping member. The clamping member is provided with a plurality of axially extending slots to form a plurality of resilient jaws which are movable radially and are shown in FIG. 3 in the open position. Each of the clamping jaws thus formed is provided with a recess in which is seated a ball bearing 42 which engages the bevel surface 52 to close the jaws 41.

Located within a bore of the writing point 3 is an axially movable slide insert 61 at the upper end of which is a tubular contact extension 63. In the rest position, the insert 61 rests upon shoulder or stop 31 formed within the writing point 2. The slide insert 61 has the lead guide tube secured therein and the tube is shown at its maximum projection indicated at 62 when in the rest position. A stop ring 32 is also arranged within the casing as a safety structure to prevent falling out of the balls 42 when the pencil device is disassembled for any reason and can also function as a stop with respect to upward movement of the slide insert 61. In addition, the interior of the collar 32 forms a stop to limit downward movement of the claws 46 on the clamping member 4.

The clamping member 4 is similarly provided with a plurality of rigid axially extending arms 44 on the ends of which are the radially inwardly directed stop claws 46.

The operative connection and transmitting forces according to the present invention is shown at 49 and comprises the bevel surfaces 49' on the thrust member 47 acting upon the corresponding bevel surfaces 49'' on the inner faces of the stop claws 46.

Within the axially extending arms 44 is a compression spring 71 which exerts axial forces and has one end resting on front face 40 of clamping member 4 and the other end resting on the rear surface of the thrust member 47 which functions as an attachment or extension of the spring under compressive forces.

The thrust member 47 has a central opening around which is formed a stop shoulder 48' which is engageable by the upper end of the tubular contact attachment 63 while at the same time the spring 71 exerts axial forces between the nesting bevel surfaces 49' and 49''.

Figure 4:
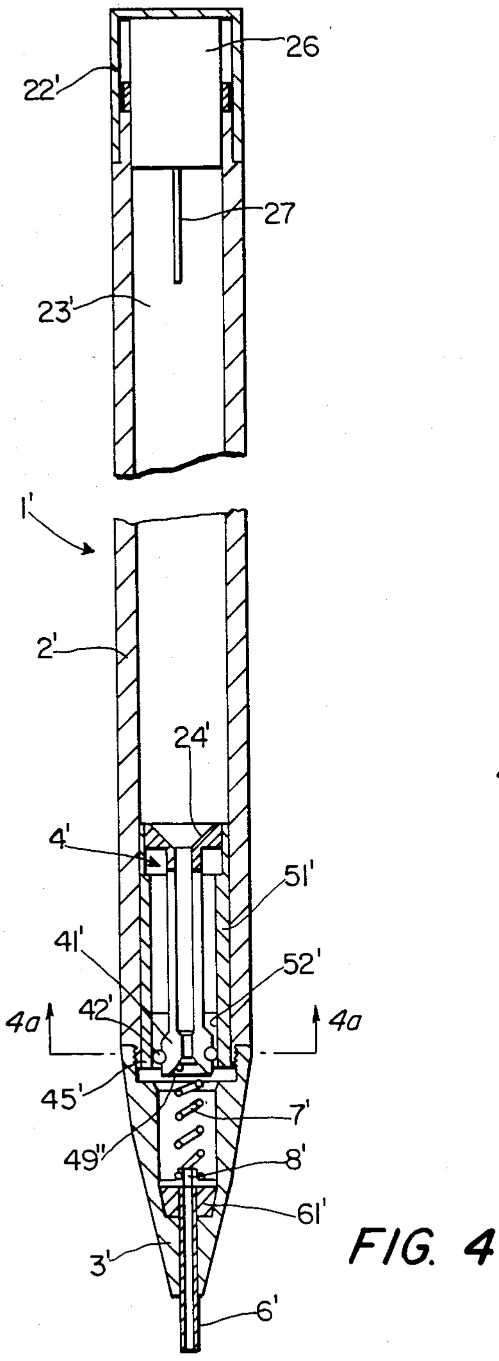
FIG. 4 is a view similar to that of FIG. 2 but showing a modification thereof without leads.
Figure 4A:
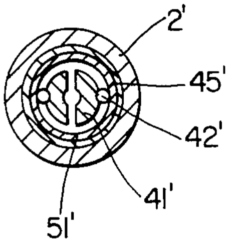
FIG. 4*a* is a transverse sectional view taken across the line 4*a*—4*a* of FIG. 4.

In FIG. 4 there is illustrated a pencil device 1' with a lead supply which can be used as a writing device for a writing or drafting machine as described above or as a normal manually held pencil and comprises components as described above with respect to the structures of FIGS. 2 and 3.

The pencil device 1' has a casing 2' the upper end of which is closed by a cap 22' and immediately below the cap is an eraser 26 in the end of which is a needle 27 for use in removing possible residual lead pieces from lead guide tube 6'. The upper portion of the casing 2' immediately below the eraser 26 constitutes a lead storage chamber 23' which is closed off at the bottom by an annular weighted collar on the end of a clamping member 4' and provided with a conical guiding surface 24'. The clamping member 4' has two clamping jaws 41' and is mounted in a clamp sleeve 51' having an inner conical surface 52' upon which ride a ball bearing 42' of the contact zone 45'.

The compression spring 7' is located within the writing point 3' and is positioned between a stop collar 61' mounted on lead guide tube 6' and the other end of the spring rests upon bevel surfaces 49'' on the lower faces of clamping jaws 41' at least during or after assuming the working position. This structure thus constitutes an operative connection which transmits forces between the lead guide tube 6 and the clamping member 4'. The lead brake 8' is formed by the stop collar 61' connected to the end of compression spring 7' and holds the lead in rest position while the clamping member 4' which is actuated into the clamping function by lead guide tube 6 holds the lead firmly during establishing of the working position and in the working position.

In order to achieve an impulse or impact to loosen the contact zone between the clamping member 4' and the conical surface 52', some play can be present in the area of the contact point between the inner end of compression spring 7 and the front end of the clamping claws in the rest position.

Figure 5:
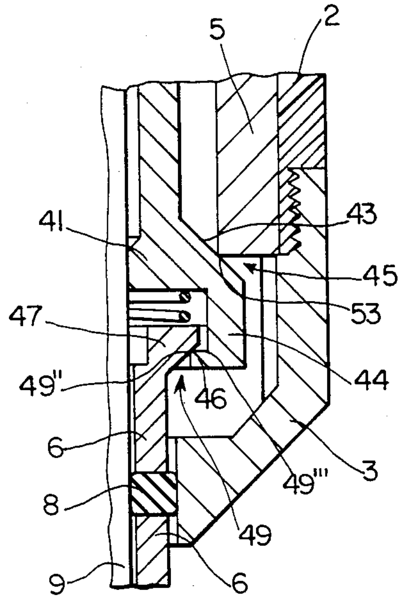
FIG. 5 is a half longitudinal section view of the writing point portion of a pencil device in the rest position and showing an additional modification thereof.

In the modification of FIG. 5, lead 9 is held in lead guide tube 6 by a lead brake 8 which acts outwardly against a wall of a bore formed in writing point 3. A thrust member 47 is formed directly on the upper end of lead guide tube 6 and is provided on its outer surface with a bevel or conical portion 49''' in the area of contact zone 49 and is acted upon by a compression spring 71 the other end of which is supported on the front face 40 of clamping jaws 41.

The clamping jaws 41 similarly have axially extending arms 44 projecting from front base 40 and the ends of the arms 44 are provided with radially inwardly directed claws 46 which are engageable with the bevel surface 49'''.

On the upper portion of the clamping jaws 41 there is provided a conical surface 43 which is engageable with edge portion 53 on the lower end of clamp sleeve 5 inside of casing 2 in order to form contact zone 45.

According to the present invention, that portion of the pencil casing containing the clamp sleeve or the clamp sleeve itself can be constructed as an axially movable sliding member in order to prevent the axial shearing forces on the lead from becoming too large. With this construction, the entire clamping mechanism can move axially upward or downward. The sliding sleeve can be freely movable or can be acted upon by a compensating spring whose compressive force can be selected as required or structure can be provided in the casing so as to vary the force exerted by the compensating spring.

It is preferable that the forward axial forces exerted by the compression spring be slightly greater than all of the counter acting forces of the spring including the weight of all axially moving parts such as, for example, the clamping mechanism, the sliding tubular structure, and the sliding clamp sleeve itself. The magnitude of the compressive force can be selected or variably adjusted as a function of the hardness of the lead employed or its wearing properties.

In order to provide for ready interchangability, or simple adjustment to the desired position of the writing device with respect to a writing or drafting machine, the device should be releasable in the bracket and preferably fastened in an axially movable manner as described above. While the present invention provides for the entire mounting bracket to move vertically to position the writing device between rest and working positions, the structure can be such that the writing device can move within the bracket.

It is thus apparent that automatic pencils provided with automatic lead feeding mechanism and intended for normal use in manual writing or drawing can be readily used as writing devices in writing, recording or drafting machines as disclosed in the present invention if they are provided with the operative connection and contact zones and other features of the present invention. It is further apparent that various forms of construction of the contact zones and operative connections can be devised but would still be within the teachings of the present invention and provide the same results.

In order to compensate for excessively high contact pressures during working or to avoid braking of the lead during positioning of the lead upon the recording support surface upon reaching the working position, a compensating spring may be provided on the clamp sleeve within the casing and supported against a portion of the clamp sleeve. However, such a spring may also be provided on the sleeve in the bracket and/or on the positioning arm against the stroke limiting structure. In the event that the device is provided with a spring so that the entire clamping mechanism is moved rearwardly by the operative connection of the lead tube, then such a clamp stop can preferably be mounted on or in a sliding sleeve structure.

It will be understood that this invention is susceptible to modifications to adapt it to different usages and conditions and, accordingly, it is desired to comprehend such modifications within this invention as may fall within the scope of the appended claims.

What is claimed is:

1. An automatic pencil device, particularly for an automatic drafting apparatus and the like, comprising a casing having a writing point at an end thereof and mountable in a bracket of a drafting apparatus which bracket is movable to bring the pencil device into a working position and a rest position, a clamp sleeve fixed within said casing, a clamping member axially movable within said clamp sleeve for clamping releasing a lead during use of the pencil device, an axially movable lead guide tube which projects outwardly of the writing point in the rest position of the pencil device, a lead brake mounted within said lead guide tube, means for defining a non-self-locking contact zone between said clamping member and said clamp sleeve, and a force transmitting connection between said clamping member and said lead guide tube comprising a compression spring and a thrust member urged by said compression spring against said lead guide tube and to contact portions of said clamping member in the rest position such that a force is transmitted to close the clamping member when the lead guide tube moves axially inwardly while assuming the working position and to open when the lead guide tube moves axially outwardly to the rest position.

2. An automatic pencil device as claimed in claim 1 wherein said contact zone comprises a conical surface on said clamp sleeve.

3. An automatic pencil device as claimed in claim 2 and further comprising a plurality of roller bearing means carried on an outer peripheral surface of said clamping member and engageable with said conical surface to transmit radial and axial forces to said clamping member.

4. An automatic pencil device as claimed in claim 1 wherein said contact zone comprises an outer bevel surface on said clamping member engageable with an edge portion of said clamp sleeve.

5. An automatic pencil device as claimed in claim 1 wherein the axial clamping force of said clamping member in the rest position against a lead is less than the axial holding force by said lead brake.

6. An automatic pencil device as claimed in claim 1 wherein said compression spring in the working position exerts an axial force on said clamping member being such that the axial clamping force of said clamping member against a lead is greater than the axial clamping force by said lead brake.

7. An automatic pencil device as claimed in claim 1 and in combination with an automatic drafting apparatus.

8. An automatic pencil device as claimed in claim 7 and further comprising a selectively movable bracket on said automatic drafting apparatus, said casing being mounted in said bracket.

9. An automatic pencil device as claimed in claim 8 and further comprising means for releasably mounting said casing in said bracket.

10. An automatic pencil device as claimed in claim 9 and further comprising means for axially moving said casing within said bracket.

11. An automatic pencil device as claimed in claim 9 and further comprising means for axially positioning said casing within said bracket.

12. An automatic pencil device as claimed in claim 11 wherein said positioning means comprises a resiliently mounted detent engageable with a selected one of a plurality of recesses disposed at varying axial positions on said casing.

13. An automatic pencil device as claimed in claim 1 and further comprising means within said casing for limiting the outward axial movement of said lead guide tube when said pencil device is moved to the rest position such that said lead guide tube is in its maximum projecting position with respect to said casing when in the rest position.

* * * * *